United States Patent
Rusch et al.

(10) Patent No.: US 11,525,473 B2
(45) Date of Patent: Dec. 13, 2022

(54) SPEED FASTENER

(71) Applicants: David Rusch, Springville, CA (US);
Daniel Nourian, Reedley, CA (US);
James Ryan Larsen, Visalia, CA (US);
Clem Neale Vann, III, Austin, TX (US)

(72) Inventors: David Rusch, Springville, CA (US);
Daniel Nourian, Reedley, CA (US);
James Ryan Larsen, Visalia, CA (US);
Clem Neale Vann, III, Austin, TX (US)

(73) Assignee: National Diversified Sales, Inc., Fresno, CA (US)

( * ) Notice: Subject to any disclaimer, the term of this patent is extended or adjusted under 35 U.S.C. 154(b) by 392 days.

(21) Appl. No.: 16/946,991

(22) Filed: Jul. 14, 2020

(65) Prior Publication Data
US 2022/0018379 A1  Jan. 20, 2022

(51) Int. Cl.
*F16B 33/02* (2006.01)
*F16B 39/28* (2006.01)

(52) U.S. Cl.
CPC .............. *F16B 33/02* (2013.01); *F16B 39/28* (2013.01)

(58) Field of Classification Search
CPC .......... F16B 33/02; F16B 39/08; F16B 39/10; F16B 39/24; F16B 39/28; Y10S 411/959; Y10S 411/965; Y10S 411/998
USPC .......................... 411/116, 129, 131, 132–134
See application file for complete search history.

(56) References Cited

U.S. PATENT DOCUMENTS

| | | | | |
|---|---|---|---|---|
| 3,019,865 A | * | 2/1962 | Rohe | F16B 5/01 |
| | | | | 428/116 |
| 4,938,644 A | * | 7/1990 | Runels | F16B 39/10 |
| | | | | 411/964 |
| 2022/0018379 A1 | * | 1/2022 | Rusch | F16B 35/044 |

* cited by examiner

*Primary Examiner* — Roberta S Delisle
(74) *Attorney, Agent, or Firm* — Fulwider Patton LLP

(57) ABSTRACT

A locking system comprising a block made of a polymer substance having an upper surface and a lower surface. In a normal condition, the block has the following structure. A bore, having a first axis, extends through the block and passes through the upper surface and the lower surface, the bore being shaped to include a taper, whereby an upper end of the bore has a larger diameter than a lower end of the bore, and the bore has an internal surface that is smooth. And, a slot, having a second axis, extends through the block and passes through the upper surface and the lower surface, the slot having a generally planar configuration with a width and a thickness, the slot being positioned such that the first axis and the second axis are co-axial, whereby the slot and the bore form a single continuous opening extending through the block.

10 Claims, 5 Drawing Sheets

SPEED FASTENER

BACKGROUND

This invention relates to a method and device for securing two objects together using a retainer and bolt system, in which the retainer is designed to be engaged with the bolt at extremely high operator speed, and with a high level of strength in the resulting connection between retainer and bolt.

Systems of securing two objects together using a nut and bolt are well known, and have been in use for many decades. Typically, the bolt has an elongate shaft that is provided with an external helical thread. A head of the bolt is positioned on one side of a first object. The nut has an elongate bore that is provided with an internal helical thread designed to exactly mate with the external thread of the bolt. The nut is positioned on an opposite side of a second object. By rotating the bolt within the nut (or by rotating the nut around the outside of the bolt), the head of the nut and the bolt are pulled towards each other, thereby pulling the first object towards, and into contact with, the second object. When the objects are joined with the desired force, the operator leaves the nut and bolt in position. The threads do not unwind because of frictional forces between the threads preventing movement.

However, problems persist in certain fields of the art of securing objects with a nut and a bolt. Because both nut and bolt are relatively small objects, it is frequently difficult for an operator to start the threading process in situations where space is limited, and it is difficult to insert and manipulate the hands. Further, rotating the nut and bolt can be a time consuming process, even where an automatic tool such as an electric drill is used for rotation. In this case, the operator must insert a socket over the head of the bolt (typically a hex-head arrangement) and then spend time running the electric drill while the bolt is advanced into the nut. Where there are many hundreds or even thousands of bolts to install into mating nuts, this process may consume an unacceptable amount of time.

Thus, there is a need in the art to provide a high speed system for connecting two objects together, with a high degree of speed, to produce a strong connection—and also, to allow that the system permits a disconnection at a later stage without damaging the system. The present invention addresses these and other needs.

SUMMARY OF THE INVENTION

In some embodiments, the invention includes a locking system comprising a block made of a polymer substance having an upper surface and a lower surface wherein the block has the following structure when in a normal condition: A bore, having a first axis, extends through the block and passes through the upper surface and the lower surface, the bore being shaped to include a taper, whereby an upper end of the bore has a larger diameter than a lower end of the bore, and the bore has an internal surface that is smooth. The block also includes a slot, having a second axis, that extends through the block and passes through the upper surface and the lower surface, the slot having a generally planar configuration with a width and a thickness, the slot being positioned symmetrically about the bore such that the first axis and the second axis are co-axial, whereby the slot and the bore form a single continuous opening extending through the block. In some embodiments, the width of the slot is at least twice the dimension of the diameter of the bore taken at the upper surface. In other embodiments, the thickness of the slot is between 10% and 15% of the dimension of the diameter of the bore taken at the upper surface. In yet further embodiments, the slot has internal corners extending vertically through the block, and the internal corners have a radius that is not smaller than 25% of the thickness of the slot. In some embodiments, the taper of the bore is angled at between 1 degree and 45 degrees to the vertical. In further embodiments, the bore defines a portion of the bore located adjacent the lower surface of the block which has a taper that is steeper than a portion of the bore located adjacent the upper surface of the block and wherein the length of the portion adjacent the lower surface is not less than 5 mm.

In other embodiments, the invention is a method for attaching a first element to a second element, wherein the second element has attached to it a block made of a polymer substance having an upper surface and a lower surface. The block includes a bore, having a first axis, which extends through the block and passes through the upper surface and the lower surface, the bore being shaped to include a reducing taper, whereby an upper end of the bore has a larger diameter than a lower end of the bore, and the bore has an internal surface that is smooth. The block also includes a slot, having a second axis, extends through the block and passes through the upper surface and the lower surface, the slot having a generally planar configuration with a width and a thickness, the slot being positioned symmetrically about the bore such that the first axis and the second axis are co-axial, whereby the slot and the bore form a single continuous opening extending through the block. The method of the invention includes inserting a tip of a bolt into an aperture in the first element, Then, passing the tip of the bolt into the bore until the tip reaches a first point down the bore where a major diameter of a thread of the bolt at the tip is equal to a diameter of the bore at the first point. At this stage, the head of the bolt is tapped with a hammer, until the tip of the bolt moves beyond the first point and forces opposing sides of the bore to move apart under elastic deformation of the polymer substance. In some embodiments, tapping the head of the bolt with a hammer includes tapping the head until an under surface of the head moves to a position that is flush with an exterior surface of the first element. In other embodiments, the method includes, after tapping the head of the bolt with a hammer, a step which includes removing the bolt from the aperture in the first element by rotating the bolt in an anti-clockwise direction. In yet further embodiments, the method includes removing the bolt from the aperture in the first element by allowing the opposing sides of the bore to return to a normal configuration of the bore.

These and other advantages will become clearer when read in conjunction with the drawings and the detailed description of preferred embodiments.

BRIEF DESCRIPTION OF THE DRAWINGS

Many aspects of the present disclosure can be better understood with reference to the following drawings. The components in the drawings are not necessarily to scale. Instead, emphasis is placed on illustrating the principles of the present disclosure.

DETAILED DESCRIPTION OF THE PREFERRED EMBODIMENTS

The applicants base the present application on the Figures identified above.

In one embodiment, the invention is a novel locking mechanism which provides a number of novel advantages when used in combination with a bolt for joining two elements together—for example a base and a lid. The geometry of the novel locking mechanism is described herein in its "normal" configuration. By "normal" it is meant that the locking system has the described geometric configuration before any force or forces are applied to the locking mechanism.

Figure 1:
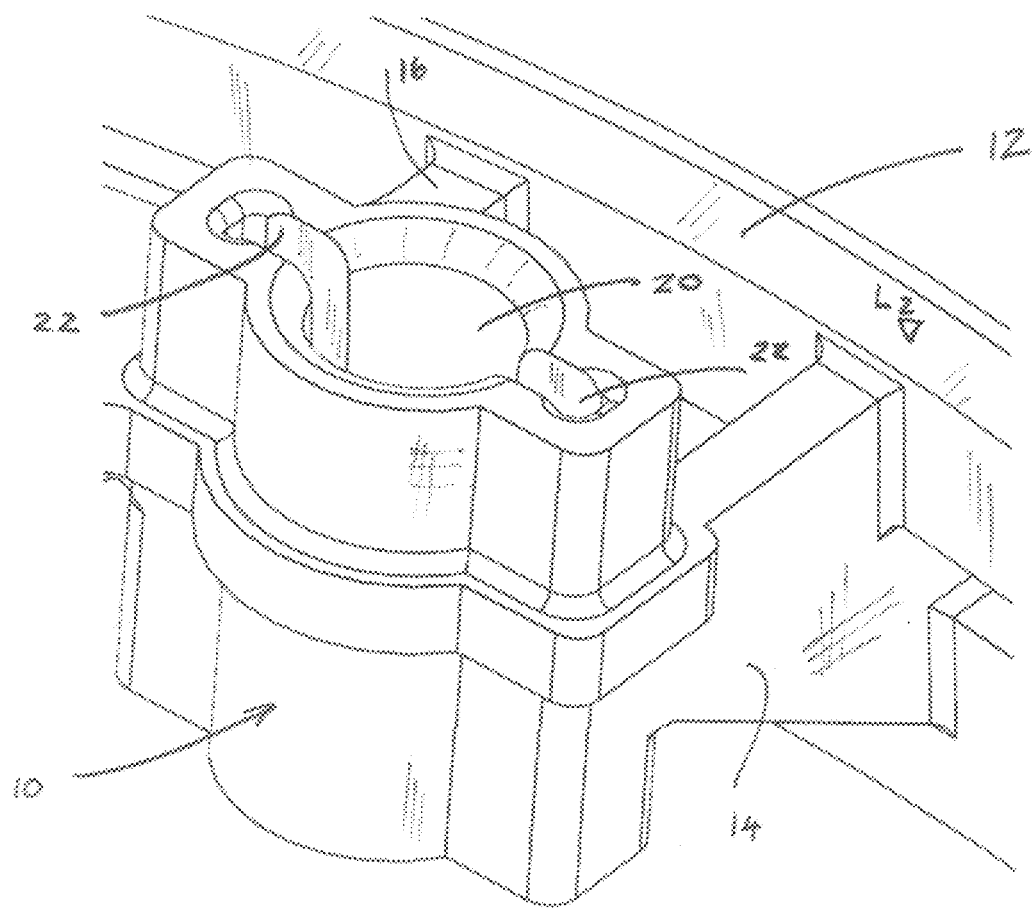
FIG. 1 is a perspective view of an embodiment of a speed retainer having features of the invention, in the context of being attached to a base element.
Figure 2:
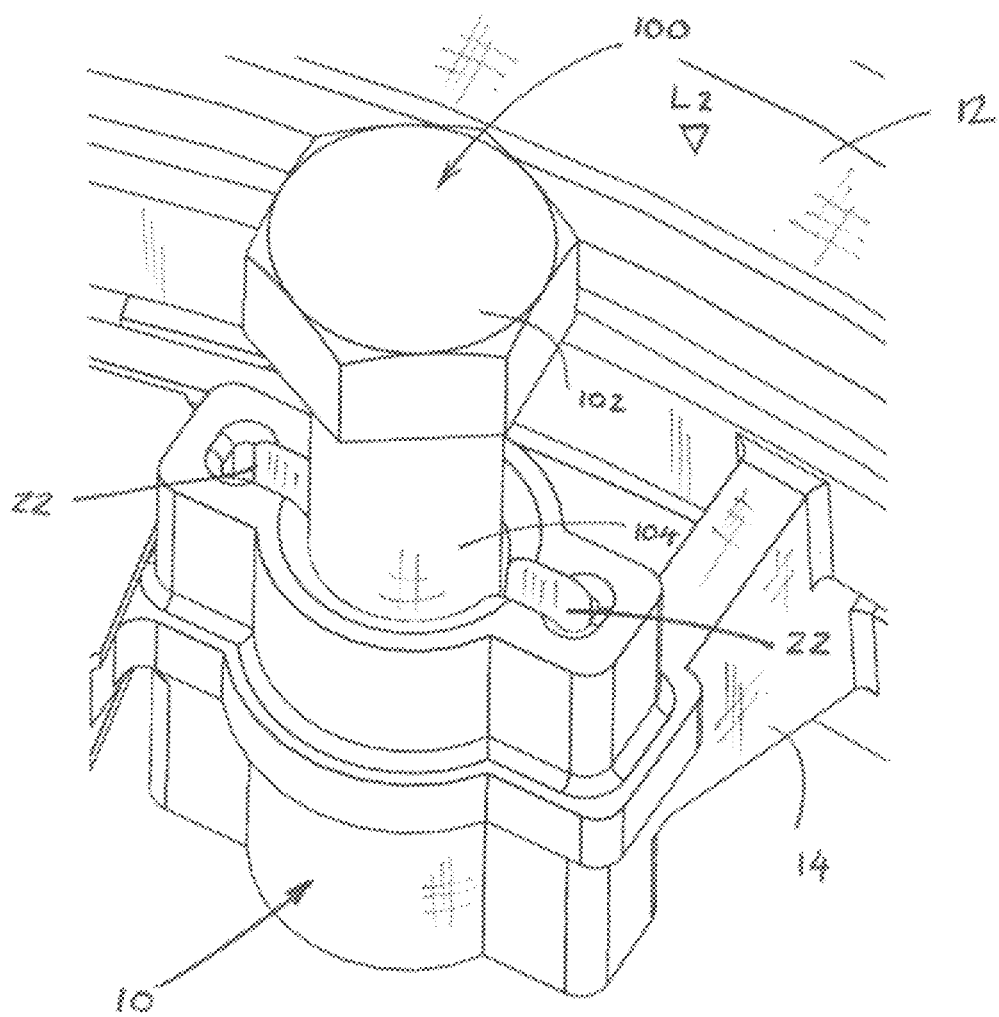
FIG. 2 shows the speed retainer of FIG. 1, with a bolt inserted into the retainer.
Figure 3:
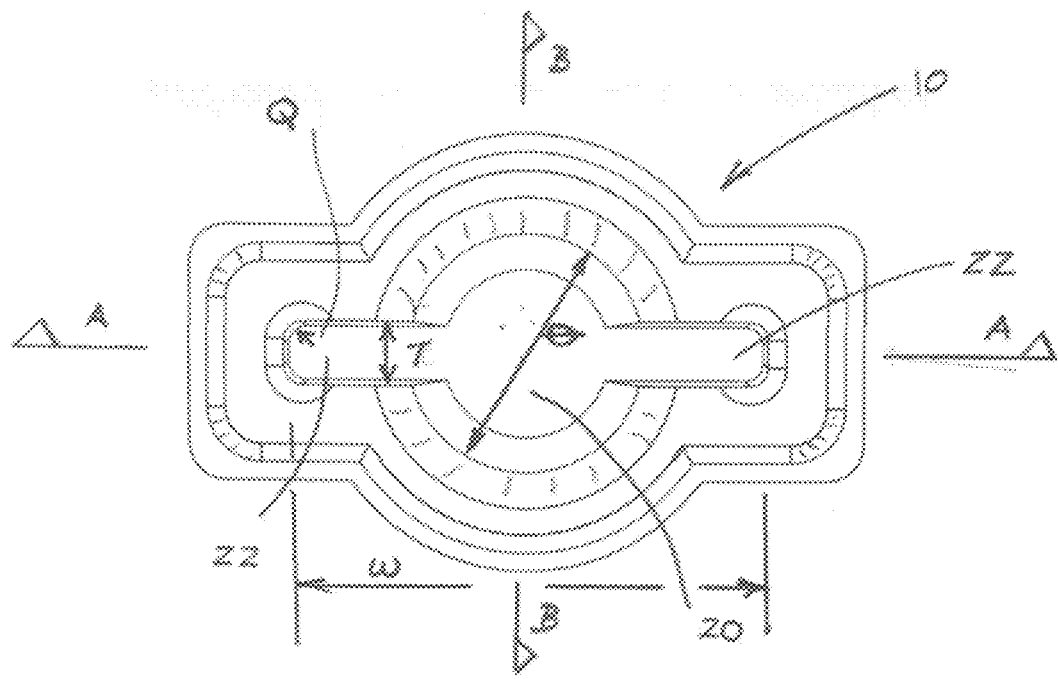
FIG. 3 is a plan view of a speed retainer having features of the invention, shown unattached to any base.
Figure 5:
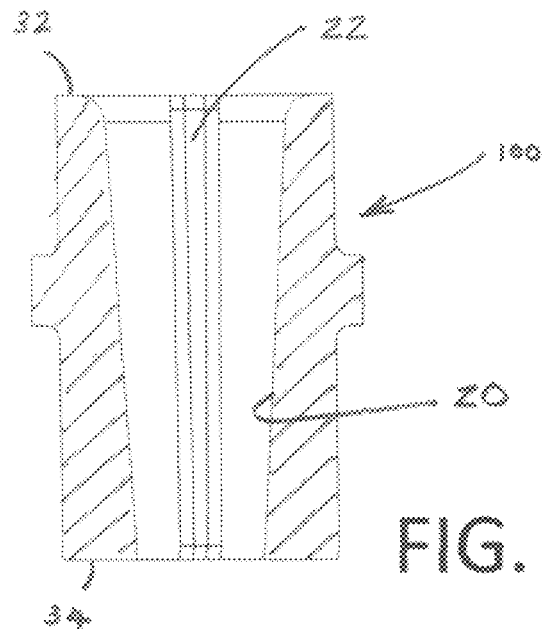
FIG. 5 is a sectional view of the speed retainer of FIG. 3, taken substantially along the line B-B.
Figure 6:
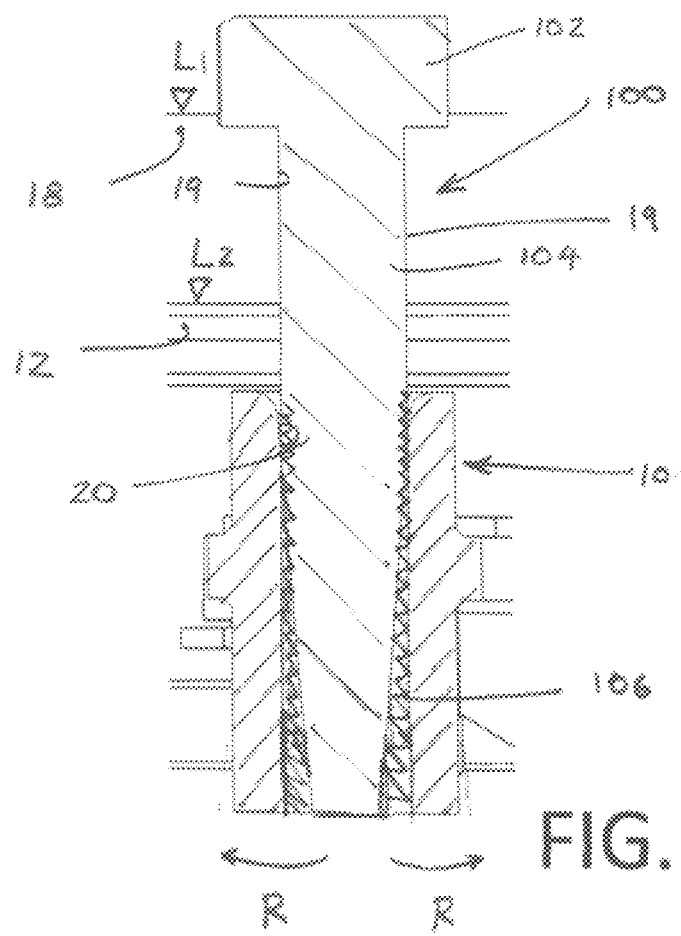
FIG. 6 is a vertical sectional view of the speed retainer having a bolt inserted into it.

An example of such a locking mechanism 10 is shown in the figures in its normal configuration. FIGS. 1, 2 and 6 show the mechanism, or speed retainer, mounted on a circular base 12, via horizontal arms 14, 16, which affix the speed retainer 10 to the base 12. For clarity, FIGS. 3-5 show the speed retainer 10 on its own, removed from the context of the base and the horizontal arms.

Figures 7, 8:
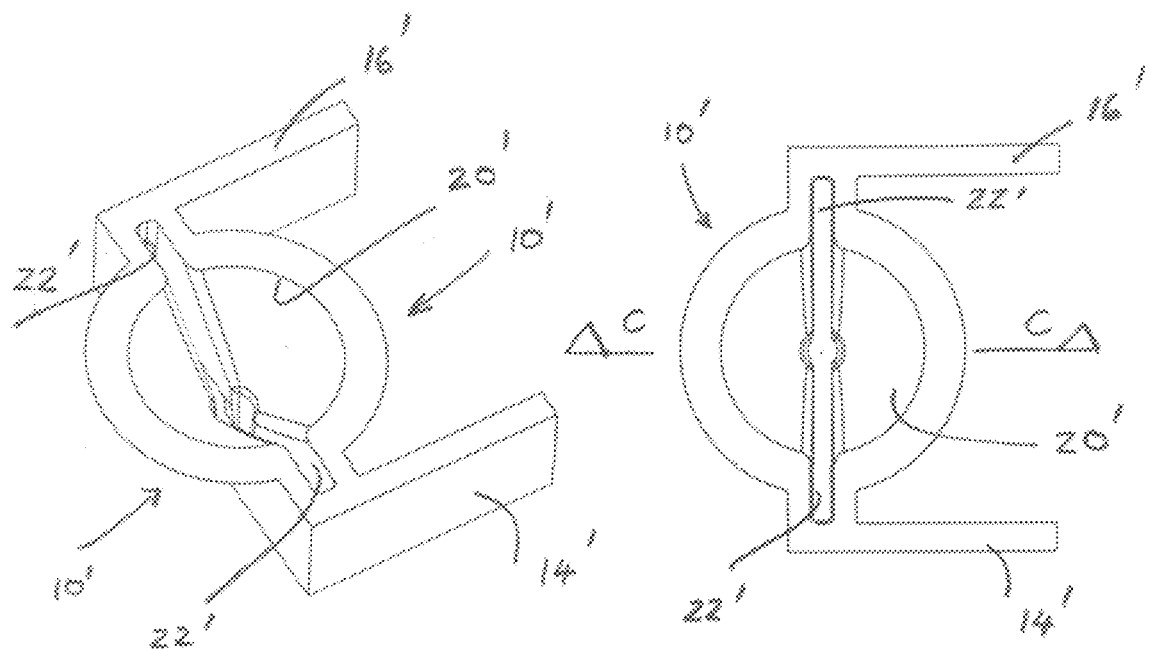
FIG. 7 is a perspective view of a further embodiment of the speed retainer of the present invention.
FIG. 8 is a plan view of the speed retainer shown in FIG. 7.
Figure 9:
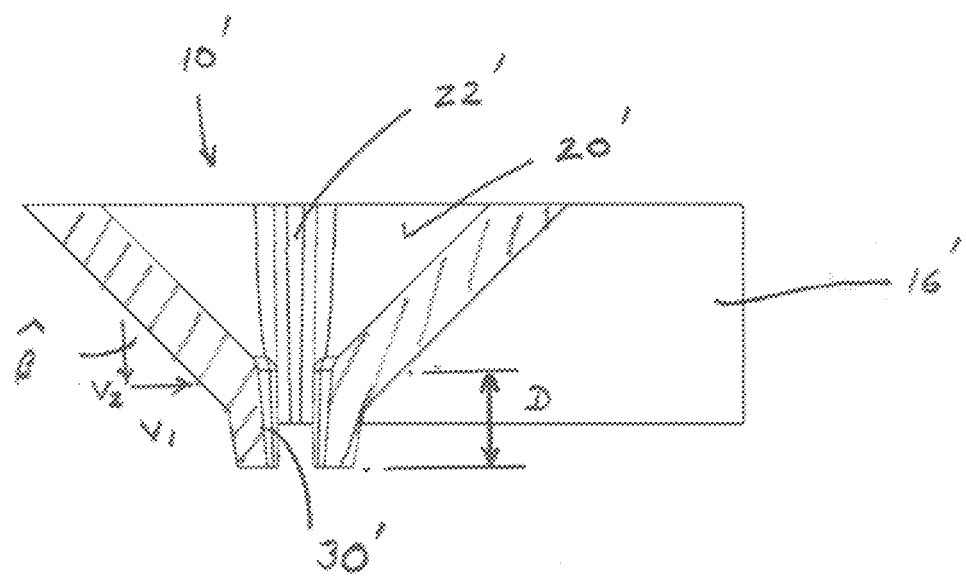
FIG. 9 is a sectional view of the speed retainer of FIG. 8, taken substantially through the line C-C.

FIGS. 7-9 show a further embodiment of the speed retainer 10' which possesses similar features to the speed retainer 10, but with some dimensional differences.

When used in conjunction with a base, the speed retainer 10 may be formed from the same material as the base 12, namely a polyolefin which provides a small amount of flexibility in the speed retainer, but at the same time provides the speed retainer with sufficient toughness to resist being cracked or torn apart under high stress points.

Figure 4:
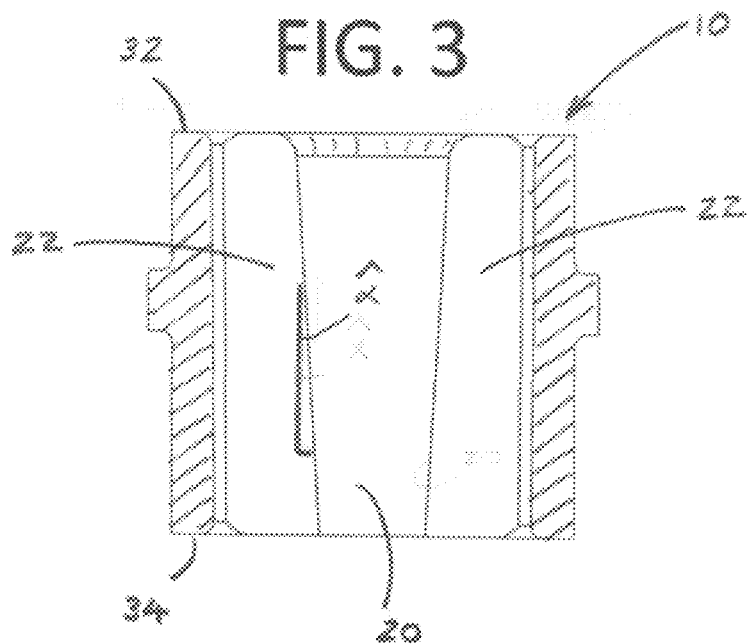
FIG. 4 is a sectional view of the speed retainer of FIG. 3, taken substantially along the line A-A.

As can be seen in the figures, the speed retainer 10 defines a central bore 20 which extends vertically (as oriented in the figures) all the way through the speed retainer, from an upper surface 32 through to a lower surface 34 (FIG. 4). The bore is smooth on its internal surface, and does not possess any threads. The bore in the embodiment shown in FIGS. 1-6 has a taper to it. In this embodiment, a preferred taper, as marked by the angle $\alpha$ in FIG. 4, and $\beta$ in the embodiment of FIG. 9, may be between 1 degrees and 45 degrees to the vertical. Although the taper shown in FIG. 4 is towards the smaller end of the stated range, the taper in FIG. 9 is towards the larger end of the stated range.

Another structural aspect of the speed retainer 10 is that it defines a planar slot 22 that extends on either side of the bore 20, vertically downward and co-axial with the axis of the bore. Effectively, a portion of the slot 22 is on the left side of the bore, and another portion of the slot 22 is on the right side of the bore, arranged symmetrically about the center axis of the bore. The slot extends all the way through the speed retainer, as shown in the figures. The width "W" of the slot in the horizontal plane (the longest horizontal dimension, from the left most end to the right most end) is preferably at least twice the diameter "θ" of the bore taken at the uppermost surface of the speed retainer. The thickness "T" of the slot 22 in the horizontal plane (the smaller horizontal dimension) is between 10% and 40% of the diameter θ of the bore taken at the uppermost surface of the speed retainer. The purpose of the slot 22 is to allow the shape of the bore to deform slightly when a circular bolt 100 is forced through the bore 20, as explained below. In order to distribute stresses evenly during use, the slot has internal corners that are given a radius Q which is not less than 25% of the thickness T of the slot. See FIG. 6.

In use.

In use of the speed retainer 10, as exemplified in FIGS. 1-6, the speed retainer may be used in combination with a standard shaped bolt 100 (which may be made either of steel, or materials, or of a hard polymer) to secure a lid 18 onto a base 12. As exemplified in FIG. 6, a lid 18 is indicated. The upper surface of a lid is identified as "L1." The lid 18 includes an aperture 19 through which the bolt 100 may pass. The base 12 has an upper surface identified in FIG. 6 as "L2." The speed retainer has a head 102 which may eventually be forced tight onto the upper surface L1 of the lid 18 to an immovable condition, and hold the lid secure onto the base.

The novel features of the speed retainer 10 in its normal configuration as described herein permit for the following application of the bolt 100 in combination with the speed retainer 10. Recall that the speed retainer may be mounted on a base 12, via horizontal arms 14, 16, which affix the speed retainer 10 to the base 12. (FIG. 1.) An artisan wishing to rapidly install and secure the lid 18 onto the base 12 places the lid in position on the base, with the aperture 19 in the lid aligned with the bore 20 in the speed retainer. The artisan slips the tip of a bolt 100 through the aperture 19, and thence into the bore 20 of the speed retainer. The diameter of the bolt 100 is selected so that the major diameter of the threads 106 (see FIG. 6) is larger than the diameter of the bore 20 at some point within the length of the bore. (This due to the presence of the taper within the bore). Thus, the artisan is not limited to a single diameter bolt, but may use any diameter bolt in his possession that satisfies the condition that, somewhere along the length of the tapered bore, the diameter of the bore is smaller than the selected bolt's major diameter of the threads 106.

Once the bolt has passed into the bore 20 and come to a stop because the major diameter of the threads exceeds the diameter of the bore at this point, the artisan may simply take up an object with sufficient mass (referred to herein generally as a hammer, although any suitable object will suffice) and tap the bolt downwards into the bore 20 of the speed retainer 10. Because of the presence of the slot 22 extending across the bore, there is some extra flexibility in the shape of the bore, and the speed retainer may force opposing sides of the bore to separate slightly from each other, in a direction perpendicular to the plane of the slot 22—as indicated by the arrows marked "R" in FIG. 6. The walls of the speed retainer 20 are sized so that these opposing sides of the bore apply a large reactive clamping force onto the threads 106 of the bolt 100. This clamping force is sufficient to score the surface of the cone slightly to provide a mechanical gripping action onto the threads.

It will be appreciated that any attempt to pull the bolt directly upwards, without rotating it, will merely cause the clamping force exerted by the bottom ends of the bore to bite more tightly onto the threads 106 of the bolt, and may tend to score the walls of the bore even deeper, so that the mechanical retention surface is cut deeper into the surface of the bore. However, should an artisan wish to remove the bolt, then this may be achieved by rotating the bolt in an anticlockwise direction. Such rotation will tend to cut or score a helical thread into the walls of the bore 20, and this feature will grip the bore 20 and propel the bolt 100 upwards and outwards.

Advantages

Thus, an advantage achieved by the novel geometry of the speed retainer is that it allows an artisan to install a lid 18 on a base 12 with extreme speed. The artisan simply inserts the lid on the base (which carries the pre-mounted speed retainer 10) so as to align the aperture 19 in the lid and bore 20 in the speed retainer, inserts the bolt 100 into the aligned aperture and bore, then taps the head 102 of the bolt once or thrice until the lid is securely attached to the base, and the head 102 is flush with the lid. This action may take one or two seconds and is vastly more rapid than fitting a socket on the head of the bolt, and rotating the socket and hence the bolt until it reaches the fully installed position. Removal of the bolt from the speed retainer 10 is, however, just as rapid as removing a bolt from an ordinary threaded nut. Yet, it is not even necessary to use a standard bolt in the present invention. Bolts of a wide range of diameters may be used successfully, and bolts with many different thread pitches may be used successfully.

Further advantages include the fact that the connection of speed retainer to bolt will mean connecting a plastic surface to a metal surface. This has major advantages in an environment that may be at the bottom of a sump, a wet environment, thus reducing corrosion and jamming of surfaces together.

Another embodiment of the invention is shown in FIGS. 7-9 as a speed retainer 10' in which the features of the speed retainer 10 of the previous embodiment are present, with some geometric variations. The corresponding elements of this embodiment are marked with a dash, to indicate slight geometric variation. Here, the angle β by which the bore 20' of the speed retainer 10' tapers may be towards the larger end of the range of taper angles 1 degree to 45 degrees. Such an enhanced taper provides for a greater range of bolt diameter sizes that may be used in combination with the speed retainer 10'. One of ordinary skill will appreciate that a larger taper angle permits a wider range of bolt diameters to slip into the bore 20' without passing straight through the bore without touching sides. This opens up a range of bolt sizes that an artisan may carry in a toolbag, and still be able to use each one in conjunction with the speed retainer 10' of the present invention. An additional feature of this embodiment is that towards the bottom end of the tapered bore 20' a second tapered portion 30' may be provided, in which the taper angle is steeper than the taper towards the upper end of the bore. In the portion 30' the taper angle may be between 1 degree and 5 degrees, and the length "D" of the portion may be not less than 5 mm. It will be appreciated by one of ordinary skill that when a threaded bolt is inserted directly downwardly into the bore 20' of this embodiment (such as when tapped with a hammer), and is forced through the portion 30', then the threads of the bolt will engage with the surface of portion 30' and will tend to score a mechanically retentive shape into that surface. Any force tending to remove the bolt from that location will be met by a force having a horizontal vector indicated by the arrow V1 in FIG. 9 of a force following the same direction as the plane of the bore 20' along the angle β. This horizontal force will tend to strongly engage the mechanically retentive shape of the portion 30' with the threads of the bolt. In combination with this horizontal vector V1 there will arise the vertically resistive force vector V2, which will oppose the removal of the bolt. Thus, the speed retainer of this embodiment can be used with a wide range of bolt sizes, and still be capable of fulfilling its retentive function.

It will be appreciated by one of ordinary skill that the speed retainer disclosed in the present application may be used in any context. Many of two objects that require connection to each other can be connected using a standard bolt, and the speed retainer of the present invention; or even, with a non-standard bolt, or non-standard thread pitch.

Although preferred illustrative variations of the present invention are described above, it will be apparent to those skilled in the art that various changes and modifications may be made thereto without departing from the invention. For example, it will be appreciated that combinations of the features of different embodiments may be combined to form another embodiment. It is intended in the appended claims to cover all such changes and modifications that fall within the true spirit and scope of the invention.

We claim:

1. A speed retainer comprising:
    a block made of a polymer substance having an upper surface and a lower surface wherein the block has the following structure when in a normal condition:
        a bore, having a first axis, extends through the block and passes through the upper surface and the lower surface, the bore being shaped to include a taper, whereby an upper end of the bore has a larger diameter than a lower end of the bore, and the bore has an internal surface that is smooth;
        a slot, having a second axis, extends through the block and passes through the upper surface and the lower surface, the slot having a generally planar configuration with a width and a thickness, the slot being positioned symmetrically about the bore such that the first axis and the second axis are co-axial, whereby the slot and the bore form a single continuous opening extending through the block.

2. The speed retainer of claim 1, wherein the width of the slot is at least twice the dimension of the diameter of the bore taken at the upper surface.

3. The speed retainer of claim 1, wherein the thickness of the slot is between 10% and 40% of the dimension of the diameter of the bore taken at the upper surface.

4. The speed retainer of claim 1, wherein the slot has internal corners extending vertically through the block, and the internal corners have a radius that is not smaller than 25% of the thickness of the slot.

5. The speed retainer of claim 1, wherein the taper of the bore is angled at between 1 degree and 45 degrees to the vertical.

6. The speed retainer of claim 1, wherein the bore defines a portion of the bore located adjacent the lower surface of the block which has a taper that is steeper than a portion of the bore located adjacent the upper surface of the block, and wherein a length of the portion adjacent the lower surface is not less than 5 mm.

7. A method for attaching a first element to a second element, wherein the second element has attached to it a block made of a polymer substance having an upper surface and a lower surface wherein,
    a bore, having a first axis, extends through the block and passes through the upper surface and the lower surface, the bore being shaped to include a reducing taper, whereby an upper end of the bore has a larger diameter than a lower end of the bore, and the bore has an internal surface that is smooth;

a slot, having a second axis, extends through the block and passes through the upper surface and the lower surface, the slot having a generally planar configuration with a width and a thickness, the slot being positioned symmetrically about the bore such that the first axis and the second axis are co-axial, whereby the slot and the bore form a single continuous opening extending through the block, the method comprising:

inserting a tip of a bolt into an aperture in the first element;

passing the tip of the bolt into the bore until the tip reaches a first point down the bore where a major diameter of a thread of the bolt at the tip is equal to a diameter of the bore at the first point;

tapping the head of the bolt with an hammer, until the tip of the bolt moves beyond the first point and forces opposing sides of the bore to move apart under elastic deformation of the polymer substance.

8. The method of claim 7, wherein tapping the head of the bolt with a hammer includes tapping the head until an under surface of the head moves to a position that is flush with an exterior surface of the first element.

9. The method of claim 7, further including, after tapping the head of the bolt with a hammer, a step which includes removing the bolt from the aperture in the first element by rotating the bolt in an anti-clockwise direction.

10. The method of claim 7, wherein removing the bolt from the aperture in the first element includes allowing the opposing sides of the bore to return to a normal configuration of the bore.

* * * * *